US011106546B1

(12) United States Patent
Thakur et al.

(10) Patent No.: US 11,106,546 B1
(45) Date of Patent: Aug. 31, 2021

(54) SYSTEMS AND METHODS FOR REPLICATING INFORMATION WITH INFORMATION RETENTION SYSTEMS

(71) Applicant: Veritas Technologies LLC, Santa Clara, CA (US)

(72) Inventors: Vishal Thakur, Pune (IN); Rushikesh Patil, Chopda (IN); Sunil Hasbe, Shirur Anantpal (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/893,219

(22) Filed: Jun. 4, 2020

Related U.S. Application Data (63) Continuation of application No. 16/212,584, filed on Dec. 6, 2018, now Pat. No. 10,705,924.

(51) Int. Cl.
| | | |
|---|---|---|
| *G06F 11/14* | (2006.01) | |
| *G06F 9/455* | (2018.01) | |
| *G06F 9/54* | (2006.01) | |
| *G06F 16/27* | (2019.01) | |

(52) U.S. Cl.
CPC ...... *G06F 11/1464* (2013.01); *G06F 9/45558* (2013.01); *G06F 9/546* (2013.01); *G06F 11/1484* (2013.01); *G06F 16/27* (2019.01); *G06F 2009/45562* (2013.01); *G06F 2201/815* (2013.01); *G06F 2209/548* (2013.01)

(58) Field of Classification Search
CPC ............. G06F 11/1464; G06F 9/45558; G06F 11/1484; G06F 16/27; G06F 9/546; G06F 2209/548; G06F 2009/45562; G06F 2201/815
See application file for complete search history.

(56) References Cited

U.S. PATENT DOCUMENTS

| | | |
|---|---|---|
| 8,151,263 B1 | 4/2012 | Venkitachalam et al. |
| 8,453,145 B1 | 5/2013 | Naik |
| 9,047,108 B1 | 6/2015 | Rajaa et al. |

(Continued)

OTHER PUBLICATIONS

Notice of Allowance received for U.S. Appl. No. 16/212,584 dated Mar. 4, 2020, 14 pages.

*Primary Examiner* — Sean D Rossiter
(74) *Attorney, Agent, or Firm* — FisherBroyles, LLP (57) ABSTRACT

The disclosed computer-implemented method for replicating information with information retention systems may include (1) queueing information communicated between a virtual machine and a source storage device, (2) initiating creating a clone of the virtual machine, (3) sending update information sets, (4) inserting a flush marker into a network queue, (5) stopping the queueing of the information communicated between the virtual machine and the source storage device, (6) sending, after sending the update information sets, the flush marker via a source replication gateway to the target server computing device, (7) pausing replication of the source storage device, (8) resuming replication of the source storage device responsive to completing creating the clone of the virtual machine, and (9) sending, to the target server computing device, additional information communicated between the virtual machine and the source storage device after stopping the queueing. Various other methods, systems, and computer readable media are also disclosed.

20 Claims, 4 Drawing Sheets

(56) References Cited

U.S. PATENT DOCUMENTS

| | | | |
|---|---|---|---|
| 9,201,612 B1 | 12/2015 | Vincent | |
| 10,565,062 B1 * | 2/2020 | Rajaa | G06F 11/1451 |
| 10,705,924 B1 * | 7/2020 | Thakur | G06F 11/1448 |
| 10,929,424 B1 * | 2/2021 | Vaidya | G06F 9/45558 |
| 2017/0168903 A1 | 6/2017 | Dornemann et al. | |
| 2017/0316030 A1 | 11/2017 | Shetty et al. | |
| 2018/0143879 A1 | 5/2018 | Dornemann | |
| 2018/0143880 A1 | 5/2018 | Dornemann | |
| 2020/0042537 A1 | 2/2020 | Kaushik et al. | |

* cited by examiner

SYSTEMS AND METHODS FOR REPLICATING INFORMATION WITH INFORMATION RETENTION SYSTEMS

CROSS REFERENCE TO RELATED APPLICATION

This application is a continuation of U.S. patent application Ser. No. 16/212,584, titled "SYSTEMS AND METHODS FOR REPLICATING INFORMATION WITH INFORMATION RETENTION SYSTEMS", filed Dec. 6, 2018, the disclosure of which is incorporated, in its entirety, by reference herein.

BACKGROUND

Replicating information may be a preventative security action that may hasten recovery efforts following malicious attacks on information systems. Backing-up information may be a challenging, complex, and important operation, particularly when information retention systems continuously replicate source storage devices from which virtual machines are cloned. Cloning virtual machines and replicating the cloned virtual machines to target storage devices takes time. These delays may lead to backup digital information for the cloned machines being stale, thus necessitating a subsequent full backup of the cloned virtual machines that may add further delays, affect backup digital information integrity, waste time, waste processor cycles, waste network bandwidth, and/or waste power.

SUMMARY

As will be described in greater detail below, the instant disclosure describes various systems and methods for replicating information with information retention systems.

In one embodiment, a method for replicating information with information retention systems may include (1) queueing, by a filter driver at a source server computing device and until a clone of a virtual machine is created, information communicated between the virtual machine and a source storage device, (2) initiating creating the clone of the virtual machine on the source server computing device, (3) sending, via a source replication gateway and to a target server computing device, update information sets including the information communicated between the virtual machine and the source storage device prior to initiating the queueing, (4) inserting a flush marker into a network queue after the last update information set, (5) stopping, when the flush marker is inserted into the network queue, the queueing of the information communicated between the virtual machine and the source storage device, (6) sending, after sending the update information sets, the flush marker via the source replication gateway to the target server computing device, (7) pausing replication of the source storage device, (8) resuming replication of the source storage device in response to completing creating the clone of the virtual machine, and/or (9) sending, to the target server computing device, additional information communicated between the virtual machine and the source storage device after stopping the queueing.

In an embodiment, the method may include receiving an instruction initiating the cloning of the virtual machine. In some examples, the method may include receiving, from a graphical user interface, the instruction initiating the cloning of the virtual machine.

In some examples, the target server computing device may be a cloud-based computing device.

In some embodiments, the method may include configuring the clone of the virtual machine to use a cloned target storage device coupled to the target server.

In an embodiment, the method may include (1) recording, in a dirty region log (e.g., on storage device 120 in FIG. 2 and/or source server storage device 412 in FIG. 4), an indication the queued information communicated between the virtual machine and the source storage device has potentially changed and/or (2) clearing, in response to sending the information communicated between the virtual machine and the source storage device after stopping the queueing, at least a portion of the dirty region log. In some embodiments, the method may include storing the dirty region log on the source storage device.

In an example, the method may include performing a security action including (1) receiving stored information via the source replication gateway and/or (2) writing the received information to the source storage device.

In one example, a system for replicating information with information retention systems may include several modules stored in memory, including (1) a queueing module, stored in the memory, that queues, by a filter driver at a source server computing device and until a clone of a virtual machine is created, information communicated between the virtual machine and a source storage device, (2) an initiating module, stored in the memory, that initiates creating the clone of the virtual machine on the source server computing device, (3) a first sending module, stored in the memory, that sends, via a source replication gateway and to a target server computing device, update information sets including the information communicated between the virtual machine and the source storage device prior to initiating the queueing, (4) an inserting module, stored in the memory, that inserts a flush marker into a network queue after the last update information set, (5) a stopping module, stored in the memory, that stops, when the flush marker is inserted into the network queue, the queueing of the information communicated between the virtual machine and the source storage device, (6) a second sending module, stored in the memory, that sends, after sending the update information sets, the flush marker via the source replication gateway to the target server computing device, (7) a pausing module, stored in the memory, that pauses replication of the source storage device, (8) a resuming module, stored in the memory, that resumes replication of the source storage device in response to completing creating the clone of the virtual machine, and/or (9) a third sending module, stored in the memory, that sends, to the target server computing device, additional information communicated between the virtual machine and the source storage device after stopping the queueing. The system may include at least one physical processor that executes the queuing module, the initiating module, the first sending module, the inserting module, the stopping module, the second sending module, the pausing module, the resuming module, and the third sending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) queue, by a filter driver at the source server computing device and until a clone of a virtual machine is created, information communicated between the virtual machine and a source storage device, (2) initiate creating the clone of the virtual machine on the source server computing device, (3) send, via a source replication gateway and to a target server computing device, update information sets including the information communicated between the virtual machine and the source storage device prior to initiating the queueing, (4) insert a flush marker into a network queue after the last update information set, (5) stop, when the flush marker is inserted into the network queue, the queueing of the information communicated between the virtual machine and the source storage device, (6) send, after sending the update information sets, the flush marker via the source replication gateway to the target server computing device, (7) pause replication of the source storage device, (8) resume replication of the source storage device in response to completing creating the clone of the virtual machine, and/or (9) send, to the target server computing device, additional information communicated between the virtual machine and the source storage device after stopping the queueing.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for replicating information with information retention systems. Standalone replication systems (i.e., digital information back-up systems) may provide continuous replication of digital information with minimal recovery point objectives (RPOs) and minimal recovery time objectives (RTOs). The provided systems and methods may enable protecting clones of virtual machines with such standalone replication systems in a minimal amount of time.

In some examples, the provided systems and methods may queue source virtual machine workload in/out information, create virtual machines, replicate workload in/out information communicated prior to the queueing of the workload in/out information, insert trailing flush markers into network queues, stop the queueing of the workload in/out information when the trailing flush markers are inserted into the network queues, send the trailing flush markers to target server storage devices, pause replication of source storage devices until cloning completes, and/or replicate workload in/out information communicated after the queueing of the workload in/out information.

By doing so, the systems and methods described herein may improve functioning of computing devices by managing replicating digital information in manners that may reduce delays in backing-up digital information. Further, the systems and methods described herein may improve the functioning of computing devices by managing replicating information in manners that may enhance backup digital information integrity, save time, save processor cycles, save network bandwidth, and/or save power. Further, the systems and methods described herein may improve the functioning of computing devices by providing cloned virtual machines in very short period of times and/or at substantially any points in time. Further, the systems and methods described herein may improve the functioning of computing devices by providing cloned virtual machines that are not template-based clones. Further, the systems and methods described herein may improve the functioning of computing devices by working with many different hypervisor technologies and/or not hampering operations by users.

Figure 1:
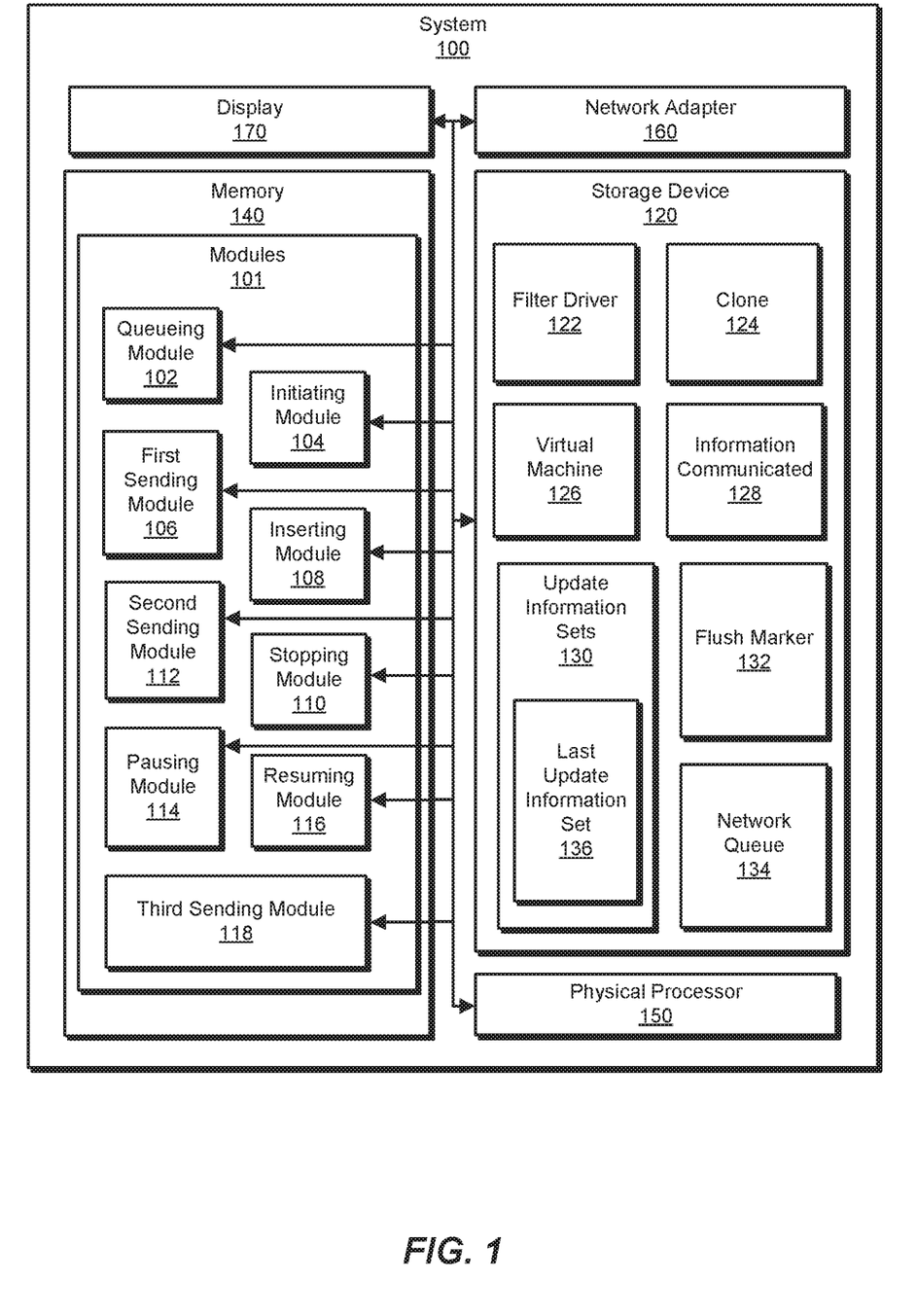
FIG. 1 is a block diagram of an example system for replicating information with information retention systems.
Figure 2:
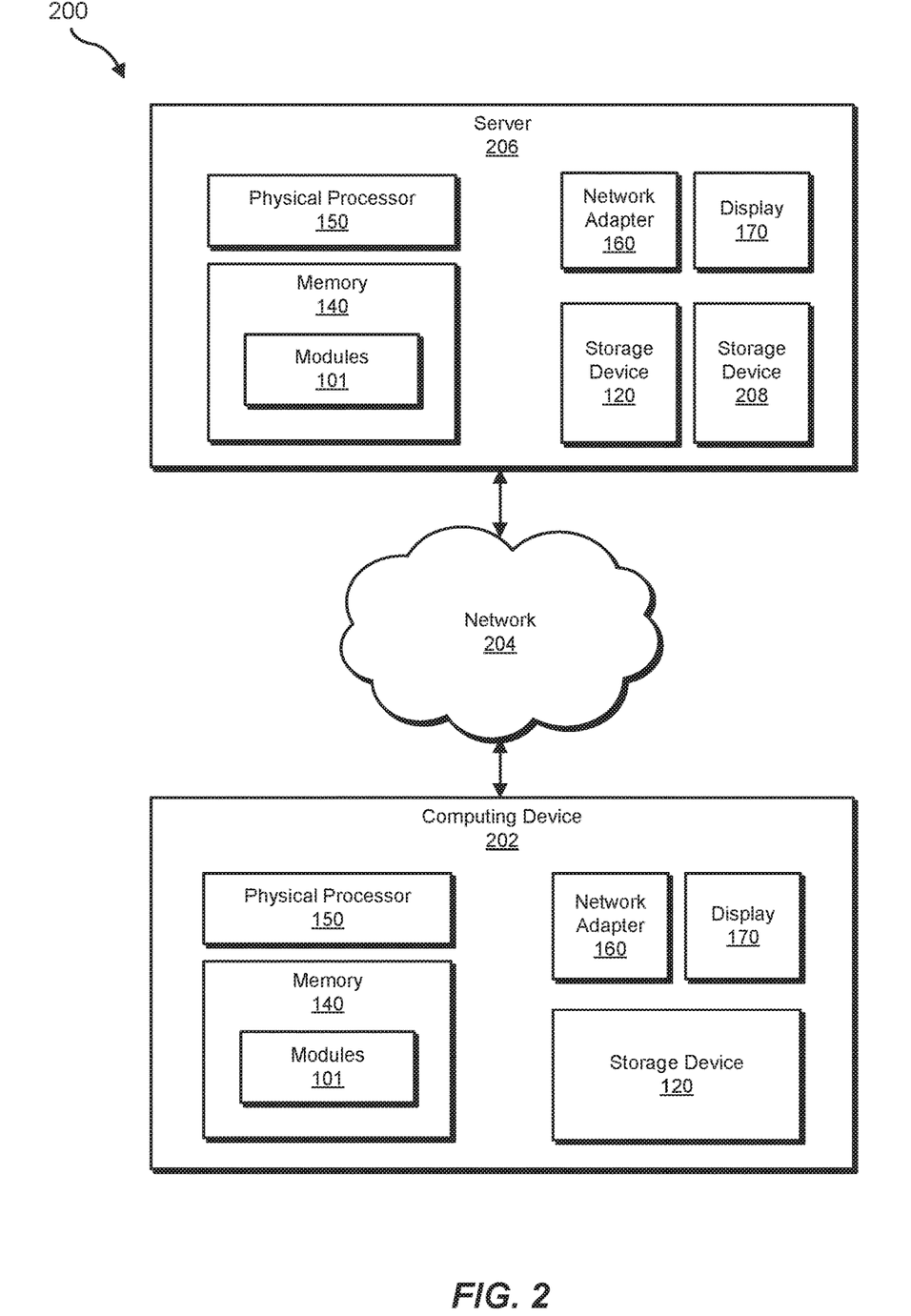
FIG. 2 is a block diagram of an additional example system for replicating information with information retention systems.
Figure 3:
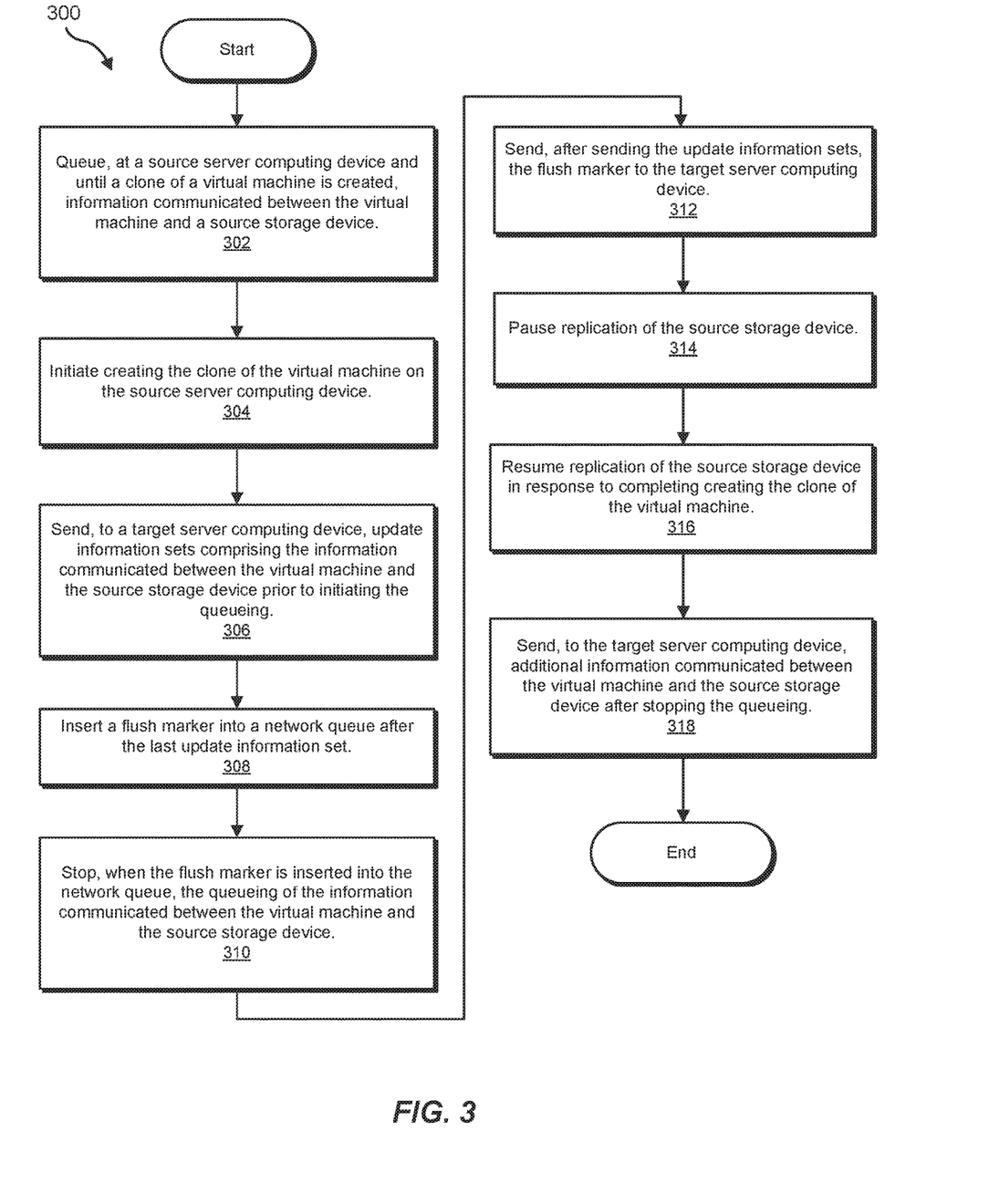
FIG. 3 is a flow diagram of an example method for replicating information with information retention systems.
Figure 4:
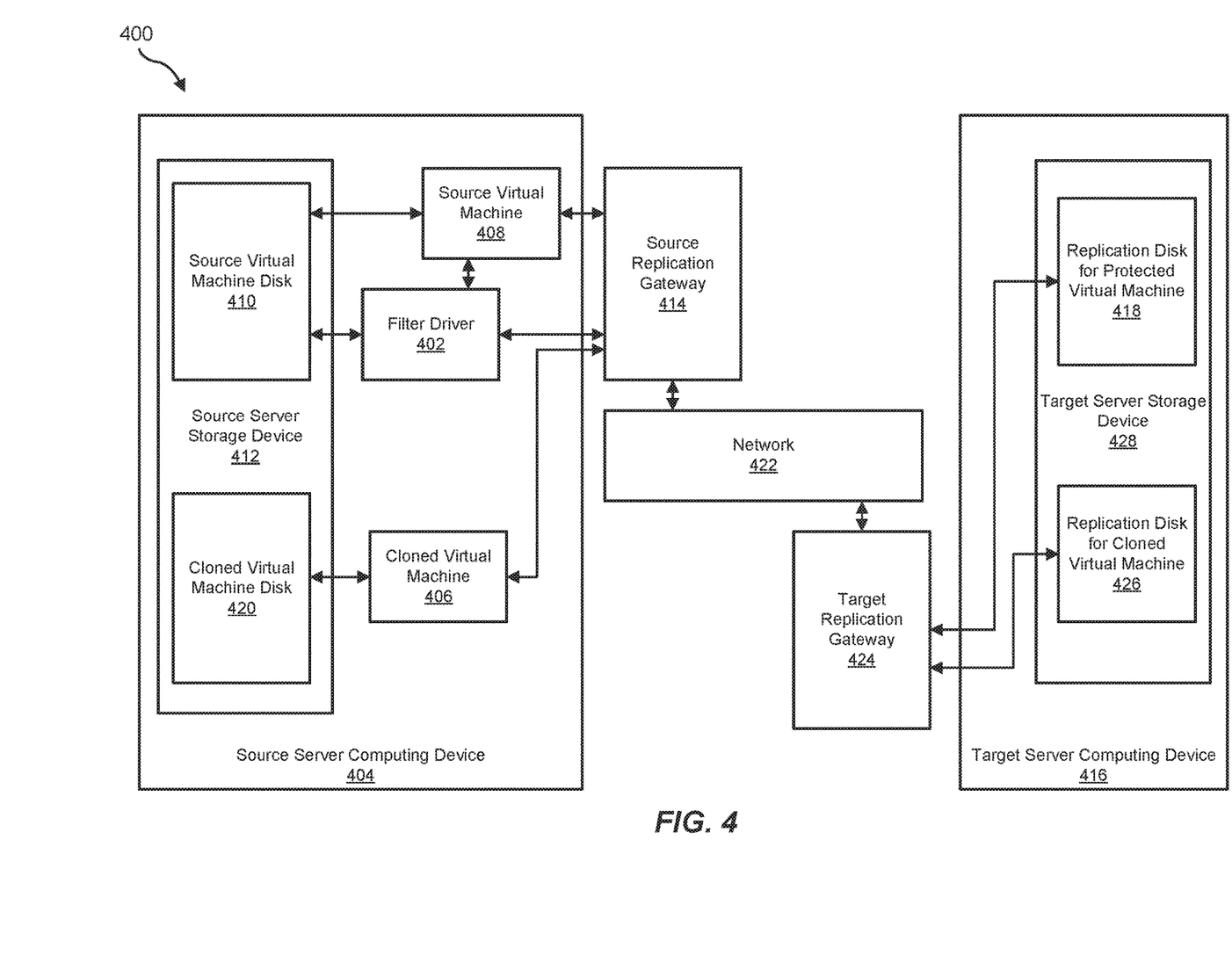
FIG. 4 is a block diagram of an additional example system for replicating information with information retention systems.

The following will provide, with reference to FIGS. 1-2 and 4, detailed descriptions of example systems for replicating information with information retention systems. Detailed descriptions of corresponding computer-implemented methods will also be provided in connection with FIG. 3.

FIG. 1 is a block diagram of an example system 100 for replicating information with information retention systems. As illustrated in this figure, example system 100 may include one or more modules 101 for performing one or more tasks. As will be explained in greater detail below, modules 101 may a queueing module 102, an initiating module 104, a first sending module 106, an inserting module 108, a stopping module 110, a second sending module 112, a pausing module 114, a resuming module 116, and/or a third sending module 118. Although illustrated as separate elements, one or more of modules 101 in FIG. 1 may represent portions of a single module or application.

In certain embodiments, one or more of modules 101 in FIG. 1 may represent one or more software applications or programs that, when executed by a computing device, may cause the computing device to perform one or more tasks. For example, and as will be described in greater detail below, one or more of modules 101 may represent modules stored and configured to run on one or more computing devices, such as the devices illustrated in FIG. 2 (e.g., computing device 202 and/or server 206). One or more of modules 101 in FIG. 1 may also represent all or portions of one or more special-purpose computers configured to perform one or more tasks.

As illustrated in FIG. 1, example system 100 may also include one or more tangible storage devices, such as storage device 120 (e.g., a source storage device). Storage device 120 generally represents any type or form of volatile or non-volatile storage device or medium capable of storing data and/or computer-readable instructions. In one example, storage device 120 may store, load, and/or maintain information indicating one or more of a filter driver 122, a clone 124, a virtual machine 126, information communicated 128 between the virtual machine and the source storage device, update information sets 130, a flush marker 132, a network queue 134, and/or a last update information set 136. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

In an example, filter driver 122 may be a hypervisor-based filter driver. In an example, filter driver 122 may synchronize digital information with digital information processing devices, replication gateways, and/or storage devices. In an example, filter driver 122 may automatically be deployed, may tap in/out data streams of virtual machines, and/or relay data blocks to replication gateways.

In some examples, information communicated 128 may include information intended to be communicated between the virtual machine and the source storage device that has not been communicated.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 101. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 150. Physical processor 150 generally represents any type or form of hardware-implemented processing unit capable of interpreting and/or executing computer-readable instructions. In one example, physical processor 150 may access and/or modify one or more of modules 101 stored in memory 140. Additionally or alternatively, physical processor 150 may execute one or more of modules 101 to facilitate replicating information with information retention systems. Examples of physical processor 150 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more network adapters, such as network adapter 160. In some examples, network adapter 160 may be a physical network adapter connected to a physical network (e.g., network 204 in FIG. 2). In some embodiments, network adapter 160 may couple system 100 to a remote storage device (e.g., a target server computing device, a target first storage device, a target second storage device, and/or an information retention system) such as a cloud-based storage device to enable information transfer between system 100 and the remote storage device.

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, display 170 may present status of and/or receive inputs relating to filter driver 122, clone 124, virtual machine 126, information communicated 128, update information sets 130, flush marker 132, network queue 134, last update information set 136, and/or a security action.

Backing-up information may be a preventative security action that may hasten recovery efforts following malicious attacks on information systems. In some non-limiting embodiments, security actions may include backing up digital information (e.g., by transferring digital information to a digital information storage device, blocking access to devices (e.g., storage devices, memories, network devices, etc.), allowing limited access to devices, allowing read-only access to devices, encrypting information, and/or other acts limiting access to devices. In some examples, security actions may be performed automatically.

In some embodiments, security actions may attempt to identify and/or ameliorate potential security risks. In additional examples, security actions may include displaying, on user displays, warnings indicating violations of access rules and/or warnings relating to backing-up digital information. In some examples, security actions may further include allowing access to information that only authenticated processes and/or users may access. In some examples, security actions may be performed according to a data loss prevention (DLP) policy.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 101 may be performed by computing device 202, server 206, and/or any other suitable computing system. As will be described in greater detail below, one or more of modules 101 from FIG. 1 may, when executed by at least one processor of computing device 202 and/or server 206, enable computing device 202 and/or server 206 to replicate information with information retention systems.

Computing device 202 generally represents any type or form of computing device capable of reading computer-executable instructions. For example, computing device 202 may represent a device running information storage management software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Server 206 generally represent any type or form of computing device capable of reading computer-executable instructions. For example, server 206 may represent a device running information storage management software. Additional examples of server 206 include, without limitation, storage servers, database servers, application servers, target server computing devices, target storage devices, information retention systems, and/or web servers configured to run certain software applications and/or provide various storage, database, and/or web services. Although illustrated as a single entity in FIG. 2, server 206 may include and/or represent a plurality of servers that work and/or operate in conjunction with one another.

As illustrated in FIG. 2, server 206 may also include one or more tangible storage devices, such as storage device 208 (e.g., a target server storage device). Storage device 208 generally represents any type or form of volatile or non-volatile storage device or medium capable of storing data and/or computer-readable instructions. In one example, storage device 208 may store, load, and/or maintain digital information. In some examples, storage device 208 may generally represent multiple storage devices. Examples of storage device 208 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

We now turn to FIGS. 3-4. FIG. 3 is a flow diagram of an example computer-implemented method 300 for replicating information with information retention systems. FIG. 4 is a block diagram of an additional example system 400 for replicating information with information retention systems.

The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may queue (e.g., by a filter driver) at source server computing devices (e.g., and until clones of virtual machines are created, information communicated between the virtual machines and source storage devices, such as application in/out digital information. The systems described herein may perform step 302 in a variety of ways. For example, queueing module 102 may, as part of computing device 202 in FIG. 2 and/or system 400 in FIG. 4, queue, by filter driver 122 at computing device 202 (e.g., a source server computing device) until clone 124 of virtual machine 126 is created, information communicated 128 between virtual machine 126 and storage device 120 (e.g., a source storage device). In another example, queueing module 102 may, as part of computing device 202 in FIG. 2 and/or system 400 in FIG. 4, queue, by a filter driver 402 at a source server computing device 404 until a cloned virtual machine 406 of a source virtual machine 408 is created, information communicated 128 between the source virtual machine 408 and a source virtual machine disk 410 (which may be a part of a source server storage device 412).

Returning to FIG. 3, in some examples, storage device 120 may include combinations of multiple storage devices and replicating processes may replicate less than entireties of storage device 120.

In some embodiments, method 300 may include receiving instructions initiating cloning of the virtual machines. In some examples, method 300 may include receiving, from graphical user interfaces (e.g., communicated via display 170), instructions initiating the cloning of the virtual machines.

In an embodiment, method 300 may include recording, in dirty region logs, indications the queued information communicated between the virtual machines and the source storage devices have potentially changed. In some embodiments, method 300 may include storing the dirty region logs on the source storage device (e.g., storage device 120 in FIG. 2 and/or source server storage device 412 in FIG. 4).

As illustrated in FIG. 3, at step 304 one or more of the systems described herein may initiate creating the clones of the virtual machines on the source server computing devices. The systems described herein may perform step 304 in a variety of ways. For example, initiating module 104 may, as part of computing device 202 in FIG. 2 and/or system 400 in FIG. 4, initiate creating clone 124 of virtual machine 126 on computing device 202. In another example, initiating module 104 may, as part of computing device 202 in FIG. 2 and/or system 400 in FIG. 4, initiate creating cloned virtual machine 406 of source virtual machine 408 on source server computing device 404. In an example, creating cloned virtual machine 406 of source virtual machine 408 may include creating cloned virtual machine disk 420. In an example, creating cloned virtual machine 406 of source virtual machine 408 may include copying digital information from source virtual machine disk 410 to cloned virtual machine disk 420.

Returning to FIG. 3, in some examples, method 300 may include configuring clones of the virtual machines to use cloned target storage devices coupled to target servers.

As illustrated in FIG. 3, at step 306 one or more of the systems described herein may send (e.g., via source replication gateways) to target server computing devices, update information sets including the information communicated between the virtual machines and the source storage devices prior to initiating the queueing. The systems described herein may perform step 306 in a variety of ways. For example, first sending module 106 may, as part of computing device 202 in FIG. 2 and/or system 400 in FIG. 4, send, via a source replication gateway and to server 206 (e.g., a target server computing device), update information sets 130 including information communicated 128 between the virtual machine and the source storage device prior to initiating the queueing. In another example, first sending module 106 may, as part of computing device 202 in FIG. 2 and/or system 400 in FIG. 4, send, (e.g., via a source replication gateway 414, a network 422, and/or a target replication gateway 424) to a target server computing device 416, update information sets 130 including information communicated 128 between source virtual machine 408 and source virtual machine disk 410 prior to initiating the queueing. In some examples, the update information sets 130 may be stored on a replication disk for a protected virtual machine 418 and/or a replication disk for cloned virtual machine 426. In an example, replication disk for a protected virtual machine 418 and/or replication disk for cloned virtual machine 426 may be stored on a target server storage device 428.

Returning to FIG. 3 in some examples, the target server computing devices may be cloud-based computing devices.

In some embodiments, server 206 in FIG. 2 and/or target server computing device 416 in FIG. 4 may receive, via a target replication gateway at a target server computing device, update information sets from a source server computing device. In some examples, server 206 in FIG. 2 and/or target server computing device 416 in FIG. 4 may write the received update information sets to a target storage device (e.g., replication disk for virtual protected machine 418 in FIG. 4) coupled to the target replication gateway (e.g., target replication gateway 424).

In an example, source replication gateways may receive in/out data from filter drivers and provide bulk transfer of data (e.g., batch, compress, and/or encrypt data) to other replication gateways.

In some embodiments, target replication gateways may receive data from other replication gateways and/or apply the data to storage devices in the target server computing devices.

As illustrated in FIG. 3, at step 308 one or more of the systems described herein may insert flush markers into network queues after the last update information sets. The systems described herein may perform step 308 in a variety of ways. For example, inserting module 108 may, as part of computing device 202 in FIG. 2 and/or system 400 in FIG. 4, insert flush marker 132 into network queue 134 after last update information set 136.

As illustrated in FIG. 3, at step 310 one or more of the systems described herein may stop, when the flush markers are inserted into the network queues, the queueing of the information communicated between the virtual machines and the source storage devices. The systems described herein may perform step 310 in a variety of ways. For example, stopping module 110 may, as part of computing device 202 in FIG. 2 and/or system 400 in FIG. 4, stop, when flush marker 132 is inserted into network queue 134, the queueing of the information communicated 128 between virtual machine 126 and storage device 120. In another example, stopping module 110 may, as part of computing device 202 in FIG. 2 and/or system 400 in FIG. 4, stop, when flush marker 132 is inserted into network queue 134, the queueing of the information communicated 128 between source virtual machine 408 and source virtual machine disk 410.

As illustrated in FIG. 3, at step 312 one or more of the systems described herein may send, after sending the update information sets, the flush markers (e.g., via the source replication gateways) to the target server computing devices. The systems described herein may perform step 312 in a variety of ways. For example, second sending module 112 may, as part of computing device 202 in FIG. 2 and/or system 400 in FIG. 4, send, after sending update information sets 130, flush marker 132 via the source replication gateway to server 206. In another example, second sending module 112 may, as part of computing device 202 in FIG. 2 and/or system 400 in FIG. 4, send, after sending update information sets 130, flush marker 132 via source replication gateway 414 to target server computing device 416.

In some embodiments, server 206 in FIG. 2 and/or target server computing device 416 in FIG. 4 may receive, via the target replication gateway, a flush marker from the source server computing device. In some examples, server 206 in FIG. 2 and/or target server computing device 416 in FIG. 4 may send, to the source server computing device and after the update information sets received prior to the flush marker are written, an acknowledgement of having received the flush marker.

As illustrated in FIG. 3, at step 314 one or more of the systems described herein may pause replication of the source storage devices. The systems described herein may perform step 314 in a variety of ways. For example, pausing module 114 may, as part of computing device 202 in FIG. 2 and/or system 400 in FIG. 4, pause replication of storage device 120 (e.g., the source storage device). In another example, pausing module 114 may, as part of computing device 202 in FIG. 2 and/or system 400 in FIG. 4, pause replication of source virtual machine disk 410 to a replication disk for protected virtual machine 418.

As illustrated in FIG. 3, at step 316 one or more of the systems described herein may resume replication of the source storage devices in response to completing creating the clones of the virtual machines. The systems described herein may perform step 316 in a variety of ways. For example, resuming module 116 may, as part of computing device 202 in FIG. 2 and/or system 400 in FIG. 4, resume replication of storage device 120 in response to completing creating clone 124 of virtual machine 126. In an example, resuming module 116 may, as part of computing device 202 in FIG. 2 and/or system 400 in FIG. 4, resume replication of storage virtual machine disk 410 in response to completing creating cloned virtual machine 406 of source virtual machine 408.

In some examples, in some examples, server 206 in FIG. 2 and/or target server computing device 416 in FIG. 4 may copy replication disk for protected virtual machine 418 (e.g., a target first storage device) to replication disk for cloned virtual machine 426 (e.g., a target second storage device).

In some examples, server 206 in FIG. 2 and/or target server computing device 416 in FIG. 4 may attach cloned virtual machine 426 to cloned virtual machine 406 on source server computing device 404.

As illustrated in FIG. 3, at step 318 one or more of the systems described herein may send, to the target server computing devices, additional information communicated between the virtual machines and the source storage devices after stopping the queueing. The systems described herein may perform step 318 in a variety of ways. For example, third sending module 118 may, as part of computing device 202 in FIG. 2 and/or system 400 in FIG. 4, send, to server 206, additional information 128 communicated between virtual machine 126 and storage device 120 after stopping the queueing. In another example, third sending module 118 may, as part of computing device 202 in FIG. 2 and/or system 400 in FIG. 4, send, to target server computing device 416 (e.g., for storing in replication disk for protected virtual machine 418), additional information 128 communicated between source virtual machine 408 and source virtual machine disk 410 after stopping the queueing.

Returning to FIG. 3, in some examples, method 300 may include clearing, in response to sending the information communicated between the virtual machines and the source storage devices after stopping the queueing, at least a portion of dirty region logs.

In some embodiments, server 206 in FIG. 2 and/or target server computing device 416 in FIG. 4 may receive, from source server computing device 404, additional information 128 communicated between source virtual machine 408 and source virtual machine disk 410 after stopping queueing of the additional information 128 communicated between source virtual machine 408 and source virtual machine disk 410.

In some examples, server 206 in FIG. 2 and/or target server computing device 416 in FIG. 4 may write the received additional information to replication disk for protected virtual machine 418 (e.g., a target first storage device) and/or replication disk for cloned virtual machine 426 (e.g., a target second storage device).

In an example, following step 318, cloned virtual machine 406 may perform differential synchronization between digital information stored on cloned virtual machine disk 420 and digital information stored on replication disk for cloned virtual machine 426.

In some embodiments, method 300 may include performing security actions including (1) receiving (e.g., as a part of retrieving) stored information, such as via the source replication gateway and (2) writing the received information to source storage devices.

As detailed above, the steps outlined in method 300 in FIG. 3 and system 400 of FIG. 4 may provide systems and methods for replicating information with information retention systems. By doing so, the systems and methods described herein may improve functioning of computing devices by managing backing-up digital information in manners that may reduce delays in backing-up digital information. Further, the systems and methods described herein may improve the functioning of computing devices by managing backing-up information in manners that may enhance backup digital information integrity, save time, save processor cycles, save network bandwidth, and/or save power. Further, the systems and methods described herein may improve the functioning of computing devices by providing a cloned virtual machine in a very short period of time, at substantially any point in time, and/or the cloned virtual machine is not a template-based clone.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that may be abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for replicating information with information retention systems, at least a portion of the method being performed by a target server computing device comprising at least one processor, the method comprising:
   receiving, via a target replication gateway at the target server computing device, update information sets from a source server computing device;
   writing the received update information sets to a target first storage device coupled to the target replication gateway;
   receiving, via the target replication gateway, a flush marker from the source server computing device;
   sending, to the source server computing device and after the update information sets received prior to the flush marker are written, an acknowledgement of having received the flush marker;
   copying information stored on the target first storage device to a target second storage device;
   attaching the target second storage device to a cloned virtual machine on the source server computing device;
   receiving, from the source server computing device, additional information communicated between a virtual machine and a source storage device after stopping queueing of the additional information communicated between the virtual machine and the source storage device; and
   writing the received additional information to the target first storage device and the target second storage device.

2. The computer-implemented method of claim 1, further comprising receiving an instruction initiating the cloning of the virtual machine.

3. The computer-implemented method of claim 2, further comprising receiving, from a graphical user interface, the instruction initiating the cloning of the virtual machine.

4. The computer-implemented method of claim 1, wherein the target server computing device is a cloud-based computing device.

5. The computer-implemented method of claim 1, further comprising configuring the cloned virtual machine to use the target second storage device.

6. The computer-implemented method of claim 1, further comprising:
   recording, in a dirty region log, an indication queued information communicated between the virtual machine and the source storage device has potentially changed; and
   clearing, in response to sending the information communicated between the virtual machine and the source storage device, at least a portion of the dirty region log.

7. The computer-implemented method of claim 6, further comprising storing the dirty region log on the source storage device.

8. The computer-implemented method of claim 1, further comprising performing a security action comprising:
   receiving stored information via a source replication gateway; and
   writing the received stored information to the source storage device.

9. A system for replicating information with information retention systems, the system comprising:
   a first receiving module, stored in a memory, that receives, via a target replication gateway at a target server computing device, update information sets from a source server computing device;
   a first writing module, stored in the memory, that writes the received update information sets to a target first storage device coupled to the target replication gateway;
   a second receiving module, stored in the memory, that receives, via the target replication gateway, a flush marker from the source server computing device;
   a sending module, stored in the memory, that sends, to the source server computing device and after the update information sets received prior to the flush marker are written, an acknowledgement of having received the flush marker;
   a copying module, stored in the memory, that copies information stored on the target first storage device to a target second storage device;
   an attaching module, stored in the memory, that attaches the target second storage device to a cloned virtual machine on the source server computing device;
   a third receiving module, stored in the memory, that receives, from the source server computing device, additional information communicated between a virtual machine and a source storage device after stopping queueing of the additional information communicated between the virtual machine and the source storage device;
   a second writing module, stored in the memory, that writes the received additional information to the target first storage device and the target second storage device; and
   at least one physical processor that executes the first receiving module, the first writing module, the second receiving module, the sending module, the copying module, the attaching module, the third receiving module, and the second writing module.

10. The system of claim 9, further comprising a fourth receiving module, stored in the memory, that receives, from a graphical user interface, an instruction initiating the cloning of the virtual machine.

11. The system of claim 9, wherein the target server computing device is a cloud-based computing device.

12. The system of claim 9, further comprising a configuring module, stored in the memory, that configures the cloned virtual machine to use the target storage device.

13. The system of claim 9, further comprising:
a recording module, stored in the memory, that records, in a dirty region log, an indication queued information communicated between the virtual machine and the source storage device has potentially changed; and
a clearing module, stored in the memory, that clears, in response to sending the information communicated between the virtual machine and the source storage device, at least a portion of the dirty region log.

14. The system of claim 9, further comprising a performing module, stored in the memory, that performs a security action comprising:
receiving stored information via a source replication gateway; and
writing the received stored information to the source storage device.

15. A non-transitory computer-readable medium comprising one or more computer-executable instructions that, when executed by at least one processor of a target server computing device, cause the target server computing device to:
receive, via a target replication gateway at the target server computing device, update information sets from a source server computing device;
write the received update information sets to a target first storage device coupled to the target replication gateway;
receive, via the target replication gateway, a flush marker from the source server computing device;
send, to the source server computing device and after the update information sets received prior to the flush marker are written, an acknowledgement of having received the flush marker;
copy information stored on the target first storage device to a target second storage device;
attach the target second storage device to a cloned virtual machine on the source server computing device;
receive, from the source server computing device, additional information communicated between a virtual machine and a source storage device after stopping queueing of the additional information communicated between the virtual machine and the source storage device; and
write the received additional information to the target first storage device and the target second storage device.

16. The non-transitory computer-readable medium of claim 15, further comprising one or more computer-executable instructions that, when executed by at least one processor of the target server computing device, cause the target server computing device to receive, from a graphical user interface, an instruction initiating the cloning of the virtual machine.

17. The non-transitory computer-readable medium of claim 15, wherein the target server computing device is a cloud-based computing device.

18. The non-transitory computer-readable medium of claim 15, further comprising one or more computer-executable instructions that, when executed by at least one processor of the target server computing device, cause the source server computing device to configure the clone of the virtual machine to use the target second storage device.

19. The non-transitory computer-readable medium of claim 15, further comprising one or more computer-executable instructions that, when executed by at least one processor of the target server computing device, cause the source server computing device to:
record, in a dirty region log, an indication queued information communicated between the virtual machine and the source storage device has potentially changed; and
clear, in response to sending the information communicated between the virtual machine and the source storage device, at least a portion of the dirty region log.

20. The non-transitory computer-readable medium of claim 15, further comprising one or more computer-executable instructions that, when executed by at least one processor of the target server computing device, cause the source server computing device to perform a security action comprising:
receiving stored information via a source replication gateway; and
writing the received stored information to the source storage device.

* * * * *